(12) United States Patent
Bauer et al.

(10) Patent No.: US 10,720,802 B2
(45) Date of Patent: Jul. 21, 2020

(54) LAMINATED CORE AND METHOD FOR PRODUCING SAME

(71) Applicant: Kienle + Spiess GmbH, Sachsenheim (DE)

(72) Inventors: Steffen Bauer, Zaberfeld (DE); Björn Böker, Esslingen (DE)

(73) Assignee: Kienle + Spiess GmbH, Sachsenheim (DE)

( * ) Notice: Subject to any disclaimer, the term of this patent is extended or adjusted under 35 U.S.C. 154(b) by 397 days.

(21) Appl. No.: 15/500,103

(22) PCT Filed: Jul. 30, 2015

(86) PCT No.: PCT/EP2015/001569
§ 371 (c)(1),
(2) Date: Jan. 30, 2017

(87) PCT Pub. No.: WO2016/015869
PCT Pub. Date: Feb. 4, 2016

(65) Prior Publication Data
US 2017/0250581 A1 Aug. 31, 2017

(30) Foreign Application Priority Data

Jul. 30, 2014 (DE) .................. 10 2014 011 474

(51) Int. Cl.
*H02K 1/06* (2006.01)
*H02K 1/18* (2006.01)
(Continued)

(52) U.S. Cl.
CPC .............. *H02K 1/18* (2013.01); *H02K 1/28* (2013.01); *H02K 15/02* (2013.01); *H02K 1/12* (2013.01); *H02K 1/22* (2013.01); *H02K 2201/09* (2013.01)

(58) Field of Classification Search
CPC . H02K 1/18; H02K 1/28; H02K 15/02; Y10T 29/49009; Y10T 29/49012
(Continued)

(56) References Cited

U.S. PATENT DOCUMENTS 3,202,851 A * 8/1965 Dehlendorf .............. H02K 1/16
310/216.048
3,299,304 A 1/1967 Hull
(Continued)

FOREIGN PATENT DOCUMENTS

CN 101 063 723 10/2007
DE 10 2012 200101 7/2013
(Continued)

*Primary Examiner* — Thanh Lam
(74) *Attorney, Agent, or Firm* — Gudrun E. Huckett (57) ABSTRACT

The laminated core (12) comprises laminations (10), which are arranged one over the other and which are each connected to each other by means of a first connection (9, 15). In addition, at least some of the laminations (10) are connected to each other by means of a second connection (11). By using two connections, the advantages thereof can be bundled, whereby the number and/or size of the connection points can be reduced while the requirement for the laminated core (12) remains the same or very high requirements for the laminated core (12) can be met or even increased. Advantageously, an adhesive is used as one of the connections (11), while the other connection (9, 15) can be a form-fitting connection. The adhesive (11) is applied to the lower side (13) and/or upper side (14) of the laminations (10) before or after the punching of the laminations (10). However, the two connections can also be formed by two adhesive systems. Finally, the connections (9, 10; 11) can also be formed by at least one weld seam and additionally by an adhesive.

5 Claims, 4 Drawing Sheets

(51) Int. Cl.
  *H02K 1/28* (2006.01)
  *H02K 15/02* (2006.01)
  *H02K 1/22* (2006.01)
  *H02K 1/12* (2006.01)

(58) Field of Classification Search
  USPC .................. 310/216.048; 29/596, 572, 659
  See application file for complete search history.

(56) References Cited

U.S. PATENT DOCUMENTS

| | | | |
|---|---|---|---|
| 3,465,188 A | 9/1969 | Sisk | |
| RE26,788 E * | 2/1970 | Hull | H02K 1/185 |
| | | | 310/216.065 |
| 4,085,347 A | 4/1978 | Lichius | |
| 4,264,663 A * | 4/1981 | Beenken | H01F 3/02 |
| | | | 29/609 |
| 4,538,345 A | 9/1985 | Diederichs | |
| 4,614,022 A * | 9/1986 | Bibby | H02K 15/024 |
| | | | 29/527.2 |
| 4,922,604 A | 5/1990 | Marshall et al. | |
| 5,168,662 A | 12/1992 | Nakamura et al. | |
| 6,191,510 B1 * | 2/2001 | Landin | H02K 1/04 |
| | | | 310/216.016 |
| 6,588,093 B1 * | 7/2003 | Emmerich | H01F 27/245 |
| | | | 29/564.2 |
| 7,545,574 B2 | 6/2009 | Park et al. | |
| 2006/0125340 A1 | 6/2006 | Nishiyama et al. | |
| 2013/0154434 A1 * | 6/2013 | Hasegawa | H02K 1/16 |
| | | | 310/216.004 |
| 2015/0097463 A1 | 4/2015 | Blocher et al. | |

FOREIGN PATENT DOCUMENTS

| | | |
|---|---|---|
| EP | 0 121 173 | 10/1984 |
| EP | 2 169 805 | 3/2010 |
| GB | 1 060 705 | 3/1967 |
| JP | S5527538 | 7/1980 |
| JP | S59185144 | 10/1984 |
| JP | S60 134757 | 7/1985 |
| JP | 10127015 | 5/1998 |
| JP | 2001 009532 | 1/2001 |
| JP | 2002-151339 | 5/2002 |
| JP | 2005348456 | 12/2005 |
| JP | 2009 072014 | 4/2009 |
| JP | 2013-089883 | 5/2013 |
| WO | 2007/032183 | 3/2007 |
| WO | 2011/101986 | 8/2011 |

* cited by examiner

LAMINATED CORE AND METHOD FOR PRODUCING SAME

BACKGROUND OF THE INVENTION

The invention concerns a laminated core with laminations arranged on top of each other which each are connected to each other by a first connection as well as methods for its manufacture wherein, from a metal strip, laminations are punched and subsequently stacked to a laminated core, wherein the laminations may be provided with projections and depressions for force-locking or may be connected by a weld seam.

Laminated cores are used in electric machines, for example as stators or rotors for electric motors or generators.

The laminated cores are comprised of laminations arranged on top of each other and punched from a metal strip.

The manufacture of the laminated core can be realized in various ways outside or inside a punching tool. The laminations seated on each other are connected to each other by means of a first connection. This first connection can be a mechanical connection, an adhesive connection or a weld connection. In case of the mechanical connection, the laminations are provided with projections or embossments with which they engage appropriate cutouts or depressions of the lamination below, respectively. In case of an adhesive connection, the laminations that are resting on each other are connected to each other by an adhesive. In case of a weld connection, the laminations that are arranged on top of each other are welded to each other within the laminated core.

Apart from the advantages, the respective aforementioned employed conventional kinds of connection for producing laminated cores during the punching operation have also disadvantages however. The important advantage in punch stacking is the very quick connection of the individual laminations to a core. The disadvantages are the generation of short-circuit links within a core as well as a minimal tensile strength.

Electric short-circuits are also caused when manufacturing the laminated core by welding the laminations. Furthermore, the laminated core deforms due to thermal warping in the weld seam vicinity. Also, a change of the microstructure takes place due to the high processing temperatures in the welding zone. This can cause an uncontrolled effect on the magnetic flux during future use of the laminated core in the electric machine.

Short-circuit links generally cause magnetic loss which negatively affects the efficiency of a motor/generator.

Adhesive connections produced during a punching operation have the important advantage that they do not generate short-circuit links within a core. However, due to the high processing speed in processing electrical steel strips of up to 700 strokes per minute in the punching operation, it is mandatorily required to employ fast-curing adhesive systems. In this context, adhesives with an adhesive system are used which then preferably cure by moisture in the air, temperature or activator.

Instant adhesives that cure by moisture in the air do not have high temperature resistance and chemical resistance. The temperature-curing adhesives are generally very slow and can be used only conditionally for adhesively connecting the laminations during punching. Moreover, a high expenditure is required for core separation during the punching process. Also, the thermal separation or cooling of the joining unit relative to the punching tool and the punching press is very complex.

When using adhesive systems in connection with an initiator/activator, the media application in the punching process is performed preferably on separate sides of the electric steel strip. By using initiator/activator, high processing speeds can be achieved. The important disadvantage resides in maintaining the ideal mixing ratio and the optimal positioning of and between the adhesive and initiator/activator during the punching process. This application process can only be realized and/or monitored with very high technical expenditure and the associated very high costs. Furthermore, additional space within the punching press or punching tool is required for this equipment. Therefore, the efficiency of the punching machine drops significantly.

It is the object of the invention to configure the laminated core of the aforementioned kind and the method of the aforementioned kind in such a way that the laminated cores can be produced in a simple way such that, on the one hand, they can be handled very quickly, on the other hand, have a high resistance in respect to the further processing steps and the efficiency in use in an electrical machine is improved.

SUMMARY OF THE INVENTION

In accordance with the invention, the object is solved for the laminated core of the aforementioned kind in that at least some of the laminations are connected to each other by a second connection and, in accordance with the invention, for the methods of the aforementioned kind in that, before or after punching the laminations, an adhesive or two adhesive systems are applied onto the bottom side and/or the top side of the laminations.

In the laminated core according to the invention, the laminations are connected to each other by two connections. The two connections are matched to each other such that the disadvantages of one connection are at least approximately compensated by the advantages of the other connection. By bundling the advantages of two connections, the number and/or the size of the connecting locations can be reduced while the specification in regard to the laminated core remains the same or very high specifications, for example, from the automotive field, with regard to temperature resistance as well as chemical resistance and minimal noise development, are fulfilled or improved. The connections which are used for the laminated core according to the invention can be produced simultaneously but also sequentially during a punching operation.

Advantageously, in a first embodiment the first connection is a force-locked connection. With it, during one punching stroke the laminations resting on top of each other can be very quickly produced for handling of the laminated core and, in this way, handling after punching can be ensured.

Advantageously, the force-locked connection is formed in that in one lamination at least one projection and in the neighboring lamination at least one depression is provided in which the projection engages with friction. During stacking of the laminations, the respective upper lamination with its projection is pressed into the depression of the respective lower lamination with such a force that friction is overcome. The resulting force-locked connection between the laminations resting on each other enables simple handling of the laminated core.

According to a preferred embodiment, the projection is an embossment in the lamination. The embossment can be produced by a simple embossing process.

The second connection is advantageously a material fusion connection. The preferably employed adhesive is applied in a suitable way onto the lamination. As long as the adhesive cures, the first connection secures the cohesion of the laminations within the laminated core. The adhesive can therefore cure sufficiently so that subsequently the first and the second connections of the laminated core safely hold together the laminations resting on each other. The laminated core can therefore be handled without problems, for example, in order to apply a coil or to embed it by injection molding. Also, during transport of the laminated core, there is no the risk that it will fall apart.

The adhesive connection is advantageously formed by at least one partial adhesive application. For example, the adhesive can be applied punctiform in droplet shape on the lamination. The application can be realized advantageously contactless.

It is also possible to apply the adhesive areally onto the lamination.

In an advantageous embodiment, the first and the second connections are provided approximately in the same area on the lamination. For example, the adhesive can be provided in the area of the projection. Accordingly, the adhesive can be applied onto the projection. When the lamination is then placed with the projection onto the lamination positioned underneath, the projection engages the depression of the lower lamination while at the same time the adhesive is laterally displaced so that the laminations resting on each other not only are connected to each other by the force-locked connection (projection and depression) but also by the material fusion connection (adhesion).

In the method according to the invention, the adhesive is applied onto the bottom side and/or top side of the laminations during the punching operation prior to or after punching of the laminations. These adhesives form after curing a further connection between the laminations resting on top of each other. A hybrid connection is formed which is comprised of the projections and depressions engaging each other as the first connection as well as the adhesive as the second connection.

However, it is also possible that the first and the second connections are provided at different areas of the lamination. For example, in case of an adhesive connection, the adhesive can be provided partially or areally in the area between neighboring projections.

In a particularly advantageous embodiment, the first and the second connection are formed by a material fusion connection. In this way, a particularly gap-reduced laminated core is achieved in the punching operation in the punching tool. The first adhesive system is a very fast curing system which connects the laminations within the punching tool at very high stroke numbers, for example, >650 strokes per minute to a laminated core. The second adhesive system is characterized, for example, by a very high temperature resistance and chemical resistance as well as thermal conductivity, dielectric strength, and noise damping. The at least two different adhesive systems can be premixed prior to the application onto the electric steel strip or they are applied at different locations on the metal strip.

The adhesive systems are advantageously formed by at least one partial adhesive application. The application is realized, for example, punctiform in droplet shape on the lamination; however, also other conventional application methods are possible. The application can be realized advantageously contactless. It is also possible to apply the adhesive areally onto the lamination.

In an advantageous embodiment, the first and the second connections are provided approximately in the same area on the lamination. A hybrid connection is produced by the first material fusion connection (adhesion) and by the second material fusion connection (adhesion).

In an advantageous embodiment, the first material fusion connection is formed by at least one weld connection and the second material fusion connection by at least one at least partial adhesive connection. In this case, the weld connection advantageously is the fast-acting connection which enables parts handling of the laminated core immediately after the punching process. The adhesive connection forms in this case the permanent resistant connection which ensures the cohesion of the laminated core.

The weld connection is advantageously formed by at least one weld seam. It can be easily applied and ensures for parts handling a satisfactory cohesion of the laminations within the laminated core.

The adhesive connection is formed in an advantageous way by at least one partial adhesive application. In this case, the adhesive application is not carried out across the entire lamination surface but only partially. In this context, the partial adhesive application is such that a secure cohesion of the laminations in the laminated core is ensured.

In the first method according to the invention, the adhesive systems are applied during the punching operation onto the bottom and/or top side of the laminations. After joining and curing, a hybrid connection is formed which is comprised at least of two adhesive systems.

The adhesive system is applied in an advantageous way either in an area outside of the projections and depressions onto the laminations or immediately onto the projections. In both cases, a reliable connection of the laminations that are seated on each other in the laminated core is ensured.

In the second method according to the invention, the laminations are held together within the laminated pack in that on the bottom side and/or topside two adhesive systems are applied. In this case, the laminated cores are produced without a form fit connection. In this context, the adhesive systems are selected such that one adhesive system is fast-curing so that parts handling is possible easily. Also, this configuration of the adhesive system ensures the cohesion of the laminations while the adhesive used as the second adhesive system is curing. This adhesive ensures subsequently the secure cohesion of the laminations within the laminated core.

In the system according to the third method, the laminations are connected to each other by material fusion by weld seams. Prior to or after punching of the laminations, the adhesive is applied onto the bottom side and/or topside of the respective lamination. The weld seam holds together the laminations while the adhesive is curing. In this way, handling of the laminated core is possible already when the adhesive is not yet completely cured.

The subject matter of the application does not only result from the subject matter of the individual claims but also from all specifications and features which are disclosed in the drawings and the description. They are claimed as important to the invention even if they are not subject matter of the claims inasmuch as they are novel, individually or in combination, relative to the prior art.

Further features of the invention result from the further claims, the description, and the drawings.

BRIEF DESCRIPTION OF THE DRAWINGS

The invention will be explained with the aid of embodiments illustrated in the drawings in more detail. It is shown in.

DESCRIPTION OF PREFERRED EMBODIMENTS

Figure 1:
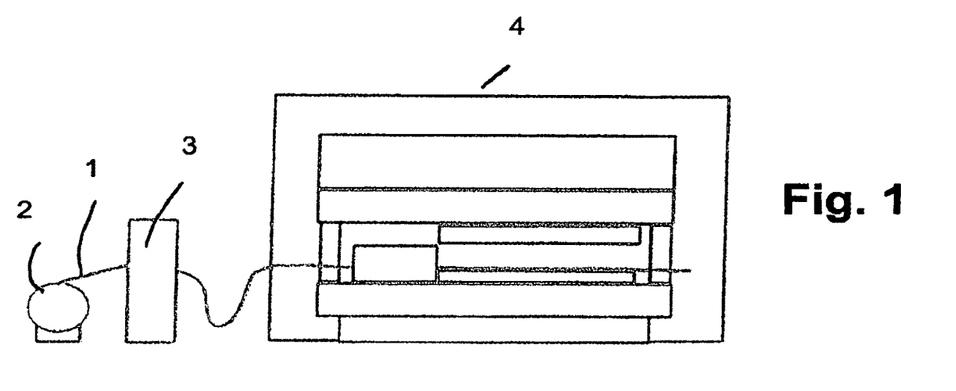
FIG. 1 in schematic illustration a punching operation for performing the method according to the invention.

For producing the laminated core, a metal strip 1 is employed that is wound as a coil onto a reel 2. The metal strip 1 can be a coated or uncoated, wide or narrow strip. The metal strip 1 is advantageously passed through a straightening apparatus 3 so that in the downstream punching press 4 the laminations can be punched cleanly from the metal strip 1. In the punching press 4, there is at least one punching tool 5 that has at least one adhesive unit 6 arranged upstream thereof, integrated therein, or arranged downstream thereof.

The laminations can be punched from the metal strip 1 in one or several tracks so that the material waste is minimal.

By means of the adhesive unit 6, in a way still to be described, adhesive is applied onto the metal strip in such a way that laminations resting on each other within the laminated core can be reliably and fixedly connected to each other. The adhesive is applied partially onto the laminations, for example, punctiform.

Figures 2, 3A:
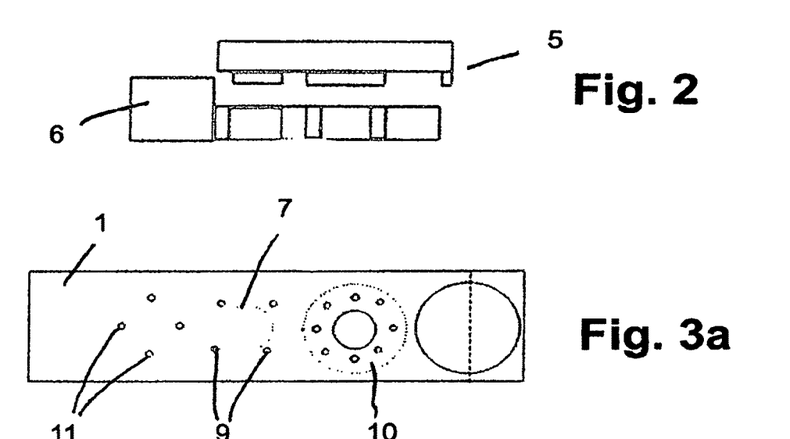
FIG. 2 in schematic illustration a punching tool with an adhesive unit arranged upstream.
FIGS. 3a and 3b a station in the adhesive unit and various stations in the punching tool according to FIG. 2.
Figure 3B:
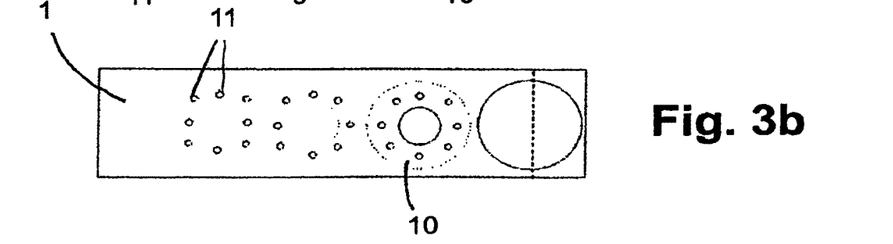

In the first station of the punching tool 5 the inner diameters 7 are punched as well as the embossments 9 for the punch stacking connection which surround the inner diameters 7 at a spacing. In the second station of the punching tool 5, a circular ring-shaped lamination 10 is punched whose a outer diameter is illustrated by the dashed line. The punched-out lamination 10 is pushed out of the metal strip 1 and pressed into an assembly unit in which the laminations in a way known in the art are layered, resting on top of each other, to a laminated core 12.

By means of the punching process according to FIGS. 1 to 3, the laminated cores are produced whose laminations 10 are connected to each other by a hybrid connection within the core 12. In this embodiment, the hybrid connection between the laminations 10 is comprised of a force-locked connection as well as a material fusion connection between the laminations 10 resting on top of each other.

In order to produce this hybrid connection, during the first stroke of the punching tool 5 the adhesive 11 is applied onto the metal strip 1 at the required location, the inner diameter 7 is punched, and the embossments 9 are produced. Subsequently, the metal strip is transported farther by an advancing length. During the next stroke of the punching press 4, the adhesive 11 is applied by means of the adhesive unit 6 at the required location of the metal strip. In the first station of the punching tool 5, the inner diameters 7 are punched as well as the embossments 9 generated and in the second punching station the annular lamination 10 is punched out.

It is pushed out in the way known in the art from the metal strip 1 and pushed downwardly into the bottom die of the punching press 4 in which the laminations are stacked to the laminated core 12 in the way known in the art. Subsequently, the metal strip 1 is further transported by an advancing length. Subsequently, during the next stroke of the punching press 4, the adhesive is applied at the required location onto the metal strip 1, in the first station of the punching tool 5 the inner diameter 7 is punched out as well as the embossments 9 produced and in the second punching station the annular lamination 10 is punched out and pushed downward into the bottom die. In this way, the laminations 10 are sequentially punched out of the metal strip 1 which is further transported between sequential punching strokes by one advancing length, respectively. In the bottom die, the connection of the laminations 10 resting on top of each other takes place by adhesive connection and by form-fit connection by means of the embossments 9 which have been embossed into the laminations 10.

Figure 4A:
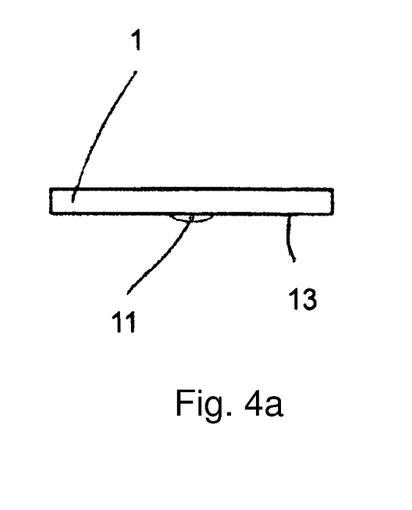
FIG. 4a to 4c different stages for producing a laminated core according to a first embodiment of the method according to the invention.

FIG. 4 shows in schematic illustration the different stages during manufacture of the laminated core 12 formed by the hybrid connection. First, the adhesive 11 is applied to the metal strip 1 and is preferably an adhesive drop applied at suitable locations of the metal strip. Since the individual laminations are connected to each other with form fit within the laminated core 10 by the embossments 9, the adhesive points 11 are applied onto the metal strip 1 in the area outside of the embossments 9. So that the adhesive 11 does not interfere with the process for producing the embossments 9, the adhesive is applied, for example, to the bottom side 13 of the metal strip 1.

The adhesive 11 can be applied in any suitable way onto the metal strip 1. It is preferred when the adhesive 11 is applied contactless to the metal strip 1.

Figure 4B:
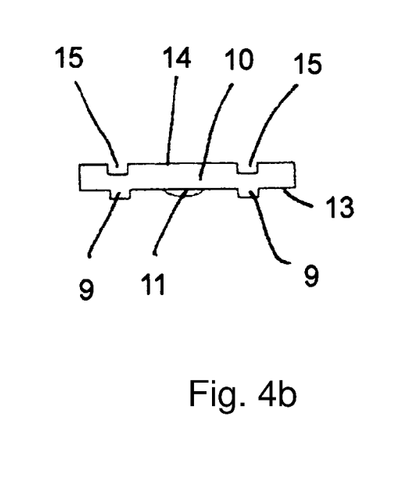
Figure 4C:
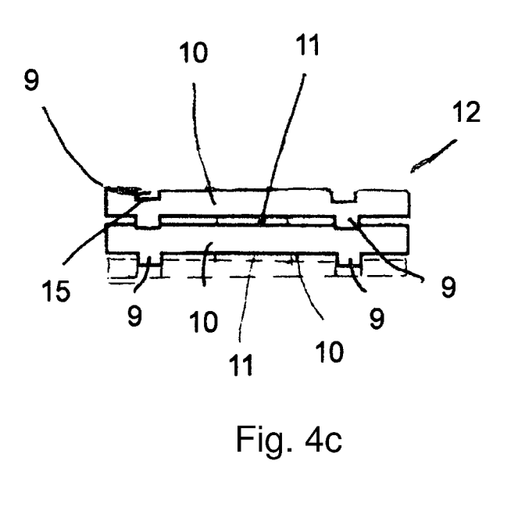

The embossments 9 are produced by a deformation process in that the appropriate plungers, distributed about the circumference, plastically deform the metal strip 1 locally. The embossments 9 project past the bottom side 13 of the metal strip. At the level of the embossments 9, corresponding depressions 15 are formed on the top side 14 of the metal strip 1 (FIG. 4b). After punching out the annular laminations 10 from the metal strip 1, they are assembled in the bottom die of the punching press 4 to laminated core 12. The laminations 10 are placed in such a way on top of each other that the embossments 9 of the respective upper lamination 10 engages the depressions 15 of the respective lower lamination 10, as indicated in FIG. 4c in an exemplary fashion for two laminations 10 resting on top of each other. The adhesive 11 is located at the bottom side 13 of the respective upper lamination 10 in the area outside of the embossments 9. For example, a drop of the adhesive 11 can be present, respectively, between neighboring embossments 9 in circumferential direction. The adhesive 11 is applied such that it is slightly thicker than the resulting gap between the respective lower lamination 10 and the upper lamination 10. In this way, the adhesive 11 upon joining the laminations 10 is spreading so that a secure adhesive connection of the laminations 10 resting on top of each other within the laminated core is formed (FIG. 4c).

The embossments 9 are designed such that they engage with press fit the depressions 15 of the respective lower lamination. In this way, a laminated core 12 is formed whose laminations 10 by means of the embossments 9 are fixedly connected to each other wherein the adhesive 11 contributes additionally to the connection of the laminations 10 resting on top of each other. The described hybrid connection enables reducing the number and/or the size of the connecting locations without having to fear limitations with regard to the functionality of the produced laminated core 12.

In the described embodiment, the laminated core 12 is produced within the punching press 4. In principle, the laminated core can also be produced outside of the punching press 4. Also, it is possible to apply the adhesive onto the metal strip outside of the punching press 4 and not within it.

In the described laminated core 12, the adhesive points 11 are provided in distribution about the circumference of the annular lamination 10 so that a secure adhesive connection between the laminations 10 resting on top of each other is ensured.

The adhesive 11 can be applied not only punctiform but also areally onto the lamination 10.

Figure 5A:
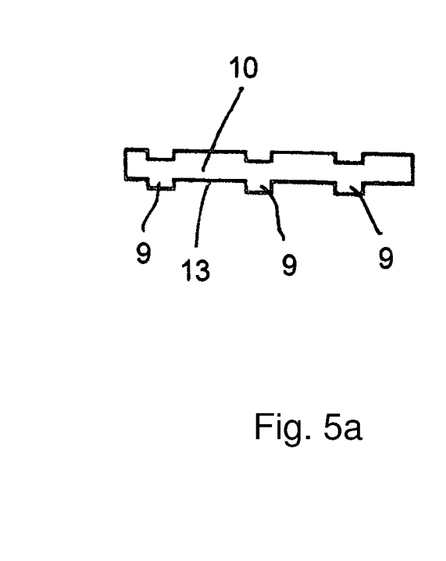
FIG. 5a to 5c different stages for producing a laminated core according to a second embodiment of the method according to the invention.
Figure 5B:
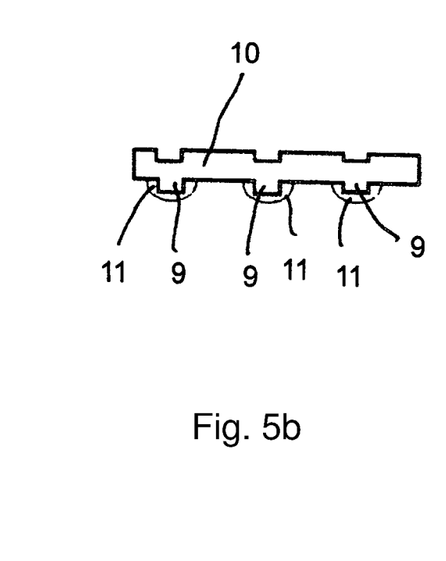

FIG. 5 shows a further possibility of a hybrid connection between laminations 10 resting on top of each other within a laminated core 12. In this embodiment, first the inner diameters 7 (FIG. 3) are punched into the metal strip 1 as well as the embossments 9 applied which project past the bottom side 13 of the lamination 10. Only subsequently, the adhesive 11 is applied onto the bottom side 13. In contrast to the previous embodiment, the adhesive 11 is applied in the area of the embossments 9 onto the bottom side 13 of the lamination 10. In this way, the embossments 9 are enveloped by the adhesive 11. The embossments 9 are again distributed about the circumference of the annular lamination.

Figure 5C:
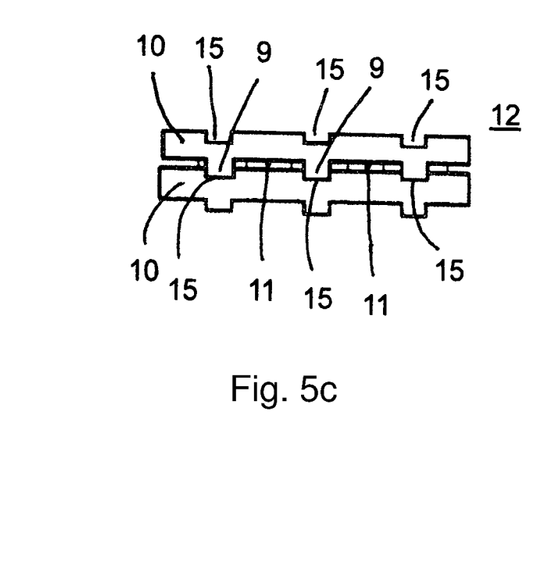

After punching from the metal strip 1, the laminations 10 are stacked in the punching press 4, or also outside thereof, for forming the laminated core 12 (FIG. 5c). The embossments 9 of the respective upper lamination 10 engage the corresponding depressions 15 of the respective lower lamination 10. The laminations are stacked with pressure application in accordance with the preceding embodiment. The embossments 9 engage with friction the depressions 15 of the respective lower lamination 10 so that a force-locked connection in axial direction of the laminated core 12 between the laminations 10 resting on top of each other is achieved. At the same time, upon placement of the respective upper lamination 10. the adhesive 11 is displaced such that it is also positioned outside of the embossments 9 and connects the laminations 10 positioned underneath with each other. The adhesive 11 surrounds in this context the respective embossment 9 (FIG. 5c).

In this embodiment, the hybrid connection between the individual laminations 10 of the laminated core 12 is also comprised of the form-fit/friction connection between the embossments 9 and the depressions 15 as well as the adhesive connection 11.

In this embodiment, the adhesive 11 can be applied also within or outside of the punching press 4. In this variant, first the embossment process is carried out in order to generate the embossments 9 on the metal strip 1. Only subsequently, the adhesive 11 is applied. In the embodiment according to FIG. 4, on the other hand, first the adhesive 11 is applied before the metal strip 1 is embossed for producing the embossments 9.

The height of the laminated core 12 is determined in that a lamination 10 is formed with through holes. This is indicated in an exemplary fashion by the dashed lines in FIG. 4c.

For forming the next laminated core 12, a cover sheet is therefore first produced that comprises through holes. Then, in the described way the laminations can be placed on this cover sheet until again a cover sheet with through holes determines the height of the lamination stack 12. In this embodiment, the height of the laminated core 12 is also determined in that the employed adhesive is formed by interruption of application.

Figure 6A:
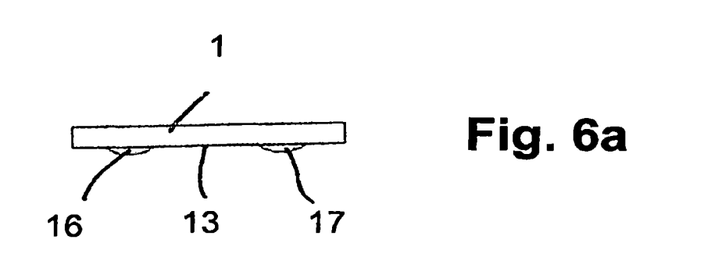
FIGS. 6a and 6b different stages for producing a laminated core according to a third embodiment of the method according to the invention.
Figure 6B:
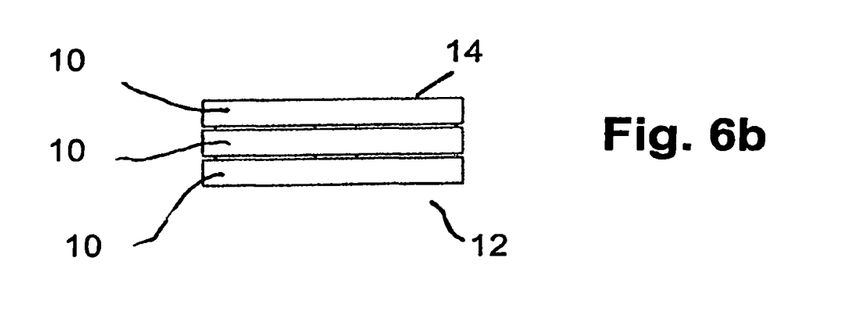

In the embodiment according to FIG. 6, the hybrid connection between the laminations resting on top of each other is produced by two adhesive connections. First, in the adhesive unit 6, the adhesive 16 and the adhesive 17 are arranged in the area of the inner diameter 7 in distribution about the circumference of the annular lamination 10 on the metal strip 1 (FIG. 3b). In this embodiment, the adhesive 16 acts as a fast connection in order to enable parts handling of the laminated core 12 directly after punching. The adhesive 17 serves as a permanent resistant connection with optimal properties of the laminated core 12 and cures with time delay in the gap between the upper lamination 10 and the lower lamination 10 of the laminated core 12.

The application of the two adhesives 16 and 17 in this embodiment can be done within the punching press 4 but also outside of it. The adhesive 16 is preferably applied contactless and punctiform to the upper lamination side 14 and/or lower lamination side 13. The adhesive 17 is preferably applied areally onto the upper lamination side 14 and/or lower lamination side 13. The resulting material fusion connection of the adhesive 16 can be enclosed by the second material fusion connection, resulting from the adhesive 17, completely between the lower lamination 10 and the upper lamination 10. In a beneficial embodiment, the adhesive 16 and the adhesive 17 can be mixed with each other. Mixing of the two adhesives 16 and 17 or adhesive systems can be realized during the punching operation or outside thereof.

In the manufacture of the sheet metal packet of two laminations 10 connected to each other with material fusion, the adhesive 16 and/or adhesive 17 are applied onto the metal strip 1 and the inner diameter 7 is applied in a first stroke of the punching press 4. Subsequently, it is further transported by an advancing length. With the next stroke of the punching press 4, the two adhesives 16 and 17 are applied again onto the metal strip 1, the inner diameter 7 is punched in the first station in of the punching tool 5, and the lamination 10 is cut out of the metal strip 1 in the second station of the punching tool.

In this embodiment, the height of the laminated core 12 is determined in that the employed adhesives are formed by interruption of application. In this way, on the uppermost lamination 10 no subsequent lamination 10 can be attached.

Figure 7A:
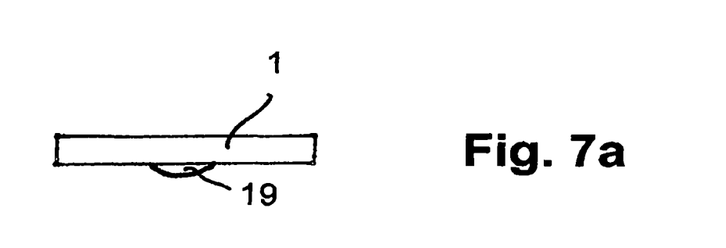
FIG. 7a to 7b different stages for producing a laminated core according to a fourth embodiment of the method according to the invention.
Figure 7B:
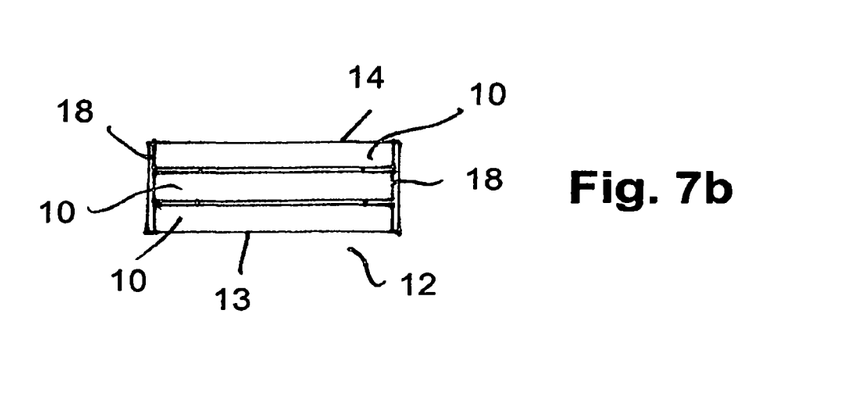

In the embodiment according to FIG. 7, the hybrid connection between the laminations 10 resting on top of each other is generated by weld connections 18 and an adhesive connection 19. On the metal strip 1, first the adhesive 19 is applied in the adhesive unit 6 at the required location on the metal strip (FIG. 7a).

In this embodiment, the weld connection 18 acts as a fast connection in order to enable parts handling of the laminated core 12 directly after punching. The adhesive 19 serves as a permanent resistant connection with optimal properties of the laminated core 12 and cures with time delay in the gap between the respective upper lamination 10 and the respective lower lamination 10 of the laminated core 12.

The application of the weld seam 18 is realized in the joining unit of the punching tool. The application of the adhesive 19 in this embodiment can take place within the punching press 4, but also outside of it. The adhesive 19 is preferably applied contactless and punctiform onto the upper lamination side 14 and/or lower lamination side 13.

The height of the laminated core 12 in this embodiment is determined in that the application of the weld seam and of the adhesive are interrupted. Accordingly, on the uppermost lamination 10 of the laminated core 12 no subsequent lamination 10 can be attached.

The described hybrid connection enables reducing the number and/or the size of the connecting locations without having to fear limitations with regard to the functionality of the produced laminated core 12.

In the described embodiments, the laminations 10 are illustrated as rings only in an exemplary fashion. The laminations can, of course, also have any other suitable shape. In the described way, individual teeth can thus be stacked to the individual tooth cores wherein the individual tooth cores subsequently are joined to a stator core or rotor core. Such laminated cores are used, for example, for rotors and/or stators of electric motors.

However, the laminations can also be provided in an exemplary fashion with an E shape or comb shape or can have other shapes.

In the described embodiments, the different connecting types of the laminations 10 among each other can be produced simultaneously but also temporally in sequence. Also, these different connecting types can be provided at the same or at different locations in the laminated core 12. For hybrid connections that comprise an adhesive connection as well as a force-locked connection, the friction/form-fit connections 9, 15 provide already a good handling of the laminated core when the adhesive is not yet completely cured. The minimal tensile strength of the force-locked connection 9, 15 is compensated by the higher tensile strength of the adhesive connection. Conversely, the reduced impact resistance and peel resistance of the adhesive connection is compensated by the form-fit/force-locking action between the embossments 9 and the depressions 15 of neighboring laminations 10. In case of hybrid connections that comprise two material fusion connections, the respective adhesive system properties can be combined so that a very fast and permanent connection between the laminations is produced. In the hybrid connection that comprises two material connections of welding and adhesive action, the respective properties can be combined also so that a fast and permanent connection between the laminations is generated.

What is claimed is:

1. A method for producing a laminated core comprising laminations arranged on top of each other, the laminations connected to each other by a first connection, respectively, wherein at least some of the laminations are connected to each other by a second connection, respectively, the method comprising:
   punching the laminations from a metal strip and providing the laminations with projections and depressions;
   forming the laminated core by subsequently stacking the laminations and force-locking the laminations with each other by engagement of the projections in the depressions to produce the first connection;
   before or after punching, applying an adhesive onto a bottom side and/or a top side of the laminations to produce the second connection.

2. The method according to claim 1, wherein the adhesive is applied in an area away from the projections and depressions.

3. The method according to claim 1, wherein the adhesive is applied onto the projections.

4. A method for producing a laminated core comprising laminations arranged on top of each other, the laminations connected to each other by a first connection, respectively, wherein at least some of the laminations are connected to each other by a second connection, respectively, the method comprising:
   punching the laminations from a metal strip;
   subsequently stacking the laminations to the laminated core,
   applying two adhesive systems to a bottom side and/or a top side of the laminations to produce the first and second connections.

5. A method for producing a laminated core comprising laminations arranged on top of each other, the laminations connected to each other by a first connection, respectively, wherein at least some of the laminations are connected to each other by a second connection, respectively, the method comprising:
   punching the laminations from a metal strip;
   subsequently stacking the laminations to the lamination core and connecting the laminations by material fusion to each other by at least one weld seam to produce the first connection;
   before or after punching the laminations, applying an adhesive onto a bottom side and/or a top side of the laminations to produce the second connection.

* * * * *